3,310,065
COMPACT POULTRY WATERING DEVICE
James B. Godshalk, Chester Spring, Pa., assignor to Fox Products Company, Philadelphia, Pa., a corporation of Pennsylvania
Filed Apr. 21, 1964, Ser. No. 361,398
10 Claims. (Cl. 137—390)

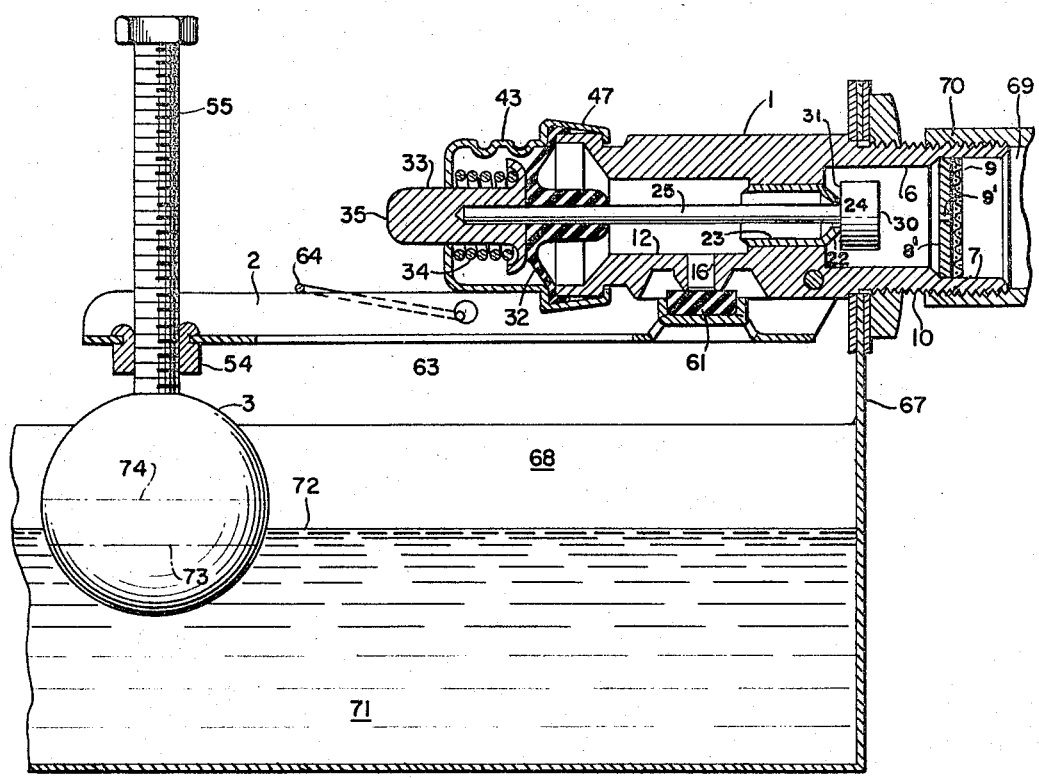
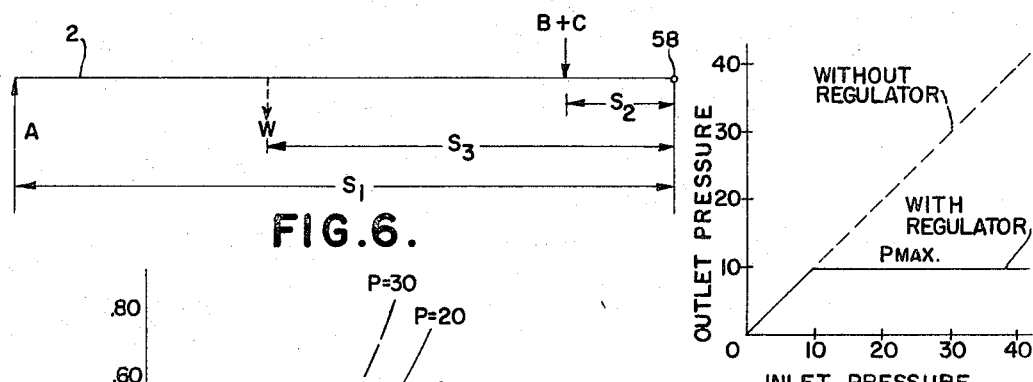
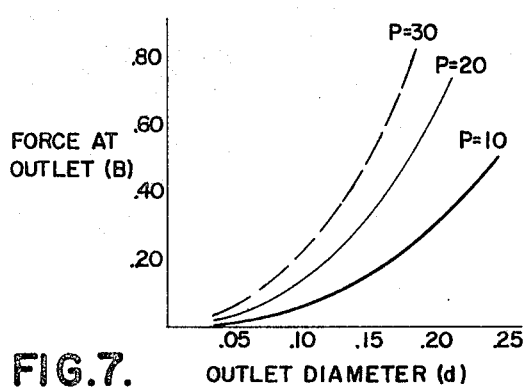
FIG. 2.
FIG. 6.
FIG. 7.
FIG. 8.
INVENTOR
James B. Godshalk
BY Arnold and Roylance
ATTORNEYS United States Patent Office 3,310,065
Patented Mar. 21, 1967

This invention relates to float-operated devices for maintaining water in a water receptacle at an accurately predetermined level. More specifically, the invention relates to poultry watering devices employing a float-operated supply valve combined with a self-contained pressure regulator for reducing the water pressure at the valve so that a miniaturized float device can be used to operate the valve.

Float-operated valves are commonly used for automatically supplying water, from a source of water under pressure, to a watering receptacle as the water is consumed by poultry or livestock. Customarily, such float operated valves are mounted adjacent one end of an elongated watering trough so that the float extends into the trough and is buoyed up by water in the trough. As the water is consumed, the level of the water in the trough drops and the float gravitates downwardly to open the supply valve to admit additional water to the trough.

A major short-coming of prior-art devices of this type has been the relatively large amount of space occupied by the body of the valve, the float arm, and the float. To avoid problems of overflow of the trough by poultry perching on the float arm or float while drinking, it has been customary to provide a cover to isolate the valve body, float arm, and float from the poultry, and this has left a substantial portion of trough unavailable for watering of the poultry.

A unique and particularly advantageous feature of the float-operated valve of this invention is its extremely small size. In some prior attempts to provide a small size or compact float-operated watering valve, the float arm was shortened, but it was then found necessary to increase the size of the float to assure closing of the valve with a reasonable degree of accuracy. Other attempts to achieve small size in such devices have involved decreasing the size of the discharge orifice of the valve so that the float and arm would operate against only a relatively small hydraulic force. Decreasing the diameter of the discharge orifice made it possible to produce a small size float operated valve but the valve was unreliable because particulate foreign matter in the water would quickly clog the discharge orifice, rendering the valve inoperative.

This invention provides a reliable watering device as small and compact as to be aptly termed a miniature device. Although the valve body is essentially the same size as in conventional watering devices, the float and arm are markedly smaller than those of prior art devices. The diameter of the discharge opening of the valve is large enough to pass small particles of foreign matter frequently found in the water supplied to the valve. Use of a miniaturized float and arm assembly in accordance with the invention is made possible by combining with the valve a self-contained pressure regulator which limits the water pressure at the discharge orifice of the valve to a small valve which can be opposed successfully by the small float and short moment arm.

Another advantageous feature of the waterer of this invention is that the pressure regulator can be manually operated to provide water flow through the valve under the full, normal line pressure. This permits the valve to be purged periodically to remove silt, mud and other small foreign matter.

Because of the conditions under which valves of this type must operate, the valves are usually made wholly of brass, stainless steel, or similar corrosion-resistant material which is relatively expensive. Since the float and arm are also made of these non-corrosive materials, the reduction in size of these elements achieved by the invention substantially decreases the cost of the watering device. Since the entire watering device of this invention, including float, float arm and valve body, has a length of approximately 3 inches, less trough space is occupied by the valve and, correspondingly, substantially more watering space is available for use by the poultry.

A general object of the invention is to provide a small size, low-cost, float-operated valve which is highly reliable in operation, and is self-cleaning.

Another object is to devise an improved poultry waterer embodying an automatic float-operated valve equipped with a self-contained pressure regulator.

Another object is to provide a float-operated valve which accurately and reliably maintains the level of liquid in a watering receptacle below a maximum predetermined level regardless of changes of pressure in the supply line to which the valve is connected.

Another object is to provide an automatic poultry waterer that is extremely compact so that, for a given water receptacle, more watering space is available for the poultry.

Another object is to provide a float-operated valve having a miniature float and arm, which has a discharge orifice of a diameter sufficient to pass small particles of foreign matter.

Another object is to provide a valve that is relatively simple to assemble and that can be easily disassembled for repair and cleaning, if necessary.

A further object is to provide a float-operated poultry watering valve with a pressure regulating valve that is not damaged by high supply line pressures.

A still further object is to devise an improved float-operated valve having a self-contained pressure regulator with manually operated means for overriding the operation of the pressure regulator to purge the valve of foreign matter.

A still further object is to provide an improved float operated valve having a self-contained pressure regulator, in which the elements of the valve and regulator are so arranged and proportioned relative to each other that water hammer normally resulting from the operation of such a valve is substantially eliminated.

In order that the manner in which these and other objects are attained in accordance with the invention can be understood in detail, reference is had to the accompanying drawings, which form a part of this specification, and wherein:

FIG. 2 is a vertical, longitudinal sectional view of the valve of FIG. 1, mounted on a poultry watering trough, FIG. 2 being on a smaller scale than FIG. 1 and showing the pressure regulating valve in closed position;

FIG. 3 is a bottom plan view of the float arm or lever of the valve of FIG. 1;

FIG. 4 is a sectional view taken on line 4—4, FIG. 1;

FIG. 5 is an end view, looking toward the inlet, of the valve of FIG. 1;

FIG. 6 is a line diagram of the forces acting on the float lever when the valve is closed;

Figure 1:
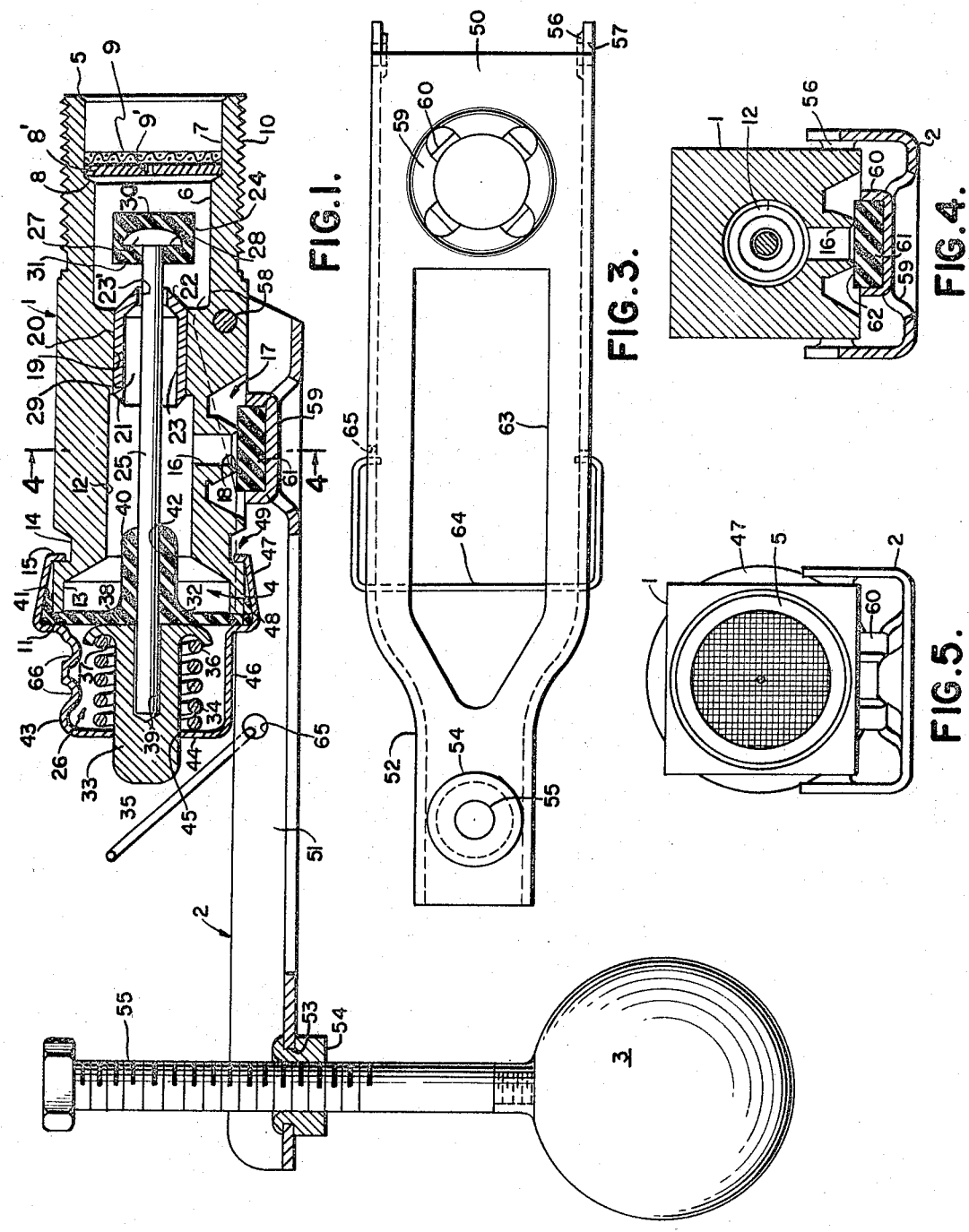
FIG. 1 is a vertical, longitudinal sectional view of a poultry watering device constructed in accordance with one embodiment of the invention, with the self-contained pressure regulating valve shown in open position.

FIG. 7 is a graph showing the relationship between the force at the float required to close the discharge opening (abscissa) at several different pressures at the discharge opening; and FIG. 8 is a graph showing the relationship between the outlet pressure (ordinate) and the supply line pressure (abscissa) in solid line for the valve of the present invention with pressure regulator, and in dotted line for a valve without a pressure regulator.

Turning now to the drawings in detail, and first to FIGS. 1 and 2 thereof, it will be seen that the embodiment of the invention here illustrated comprises an elongated valve body indicated generally at 1, a float arm in the form of an arm or lever 2 pivoted to valve body 1 and a float 3 adjustably carried by lever 2. Situated in valve body 1 is a pressure regulator indicated generally at 4.

Main body 1 is formed from an elongated piece of square stock which is preferably brass, although other corrosion-resistant materials can be used. At inlet end 5, body 1 is bored axially to form a first cylindrical chamber 6 with an enlarged cylindrical inlet 7, and an internal transverse annular shoulder 8 facing inlet end 5. Shoulder 8 forms a seat for a disc 8' disposed in bore 7. A circular filter screen 9 forced into bore 7 holds disc 8' in engagement with seat 8. At the center of disc 8' is a small orifice 9' which acts as a "bleed orifice" to limit pressure surges from the water supply line during operation of pressure regulator 4. Body 1 is externally threaded at 10 for connection to a suitable water supply pipe or hose.

At its other cylindrical end 11, body 1 is bored axially to form a second cylindrical chamber 12 axially aligned with and spaced axially from chamber 6. Second chamber 12 is counter-sunk to provide an enlarged open cylindrical mouth 13. A transverse annual groove 14, cut into the outside of body 1 adjacent end 11, provides an annular shoulder 15 having a surface which faces away from end 11 of the body and is perpendicular to the longitudinal axis of body 1.

A discharge opening 16 is formed by a bore that extends laterally through the side wall of body 1 from chamber 12 to the outside of the body. In the preferred embodiment, the axis of discharge opening 16 is perpendicular to the axis of chamber 12. Adjacent the outlet of discharge opening 16, body 1 is cut away circularly, as at 17, to provide a fixed valve member 18 which, as seen in FIGS. 1 and 2, has a tapered outer tip concentric with discharge opening 16.

Chambers 6 and 12 are separated by a transverse wall having a bore 19 which is coaxial with chamber 6 and 12 and of smaller diameter than both chambers. An insert 20 which has an outside diameter slightly greater than the diameter of bore 19 is forced into the bore. Insert 20 has a tapered edge 21 at one end, and a neck down tapered portion at the other end that forms a fixed valve element 22 concentric with a bore 23, and a much smaller inlet passage 23'. Edge 21 of the insert is tapered to facilitate centering insert 20 in bore 19 when forcing the insert into the bore. As seen in FIGS. 1 and 2, passages 23 and 23' provide communication between chamber 6 and 12, passage 23' providing an inlet opening for chamber 12.

Pressure regulator 4 includes fixed valve element 22, a movable valve element 24, an operating rod 25, and an actuating device 26.

Operating rod 25 has a rounded head 27 fixed to the end of the rod disposed in chamber 6, head 27 having a flat annular surface 28 which faces toward fixed valve element 22. As shown in FIG. 1, operating rod 25 has a diameter smaller than passages 23 and 23' of insert 20, and extends through the passages, so that an annular flow passage 29 is provided between the wall of passage 23 and the periphery of rod 25. Movable valve element 24 and formed of rubber or other suitable resilient material, is cylindrical, and has a continuous flat surface 30 facing away from fixed valve element 22 and a flat annular surface 31 facing toward fixed valve element 22. Movable valve element 24 is preferably molded about head 27, but can also be formed with an internal cavity similar in configuration to the head 27, so that the movable valve element can be snapped over the head to secure the valve element to the rod. Flat annular face 28 of head 27 has a diameter slightly larger than the diameter of fixed valve element 22 so that face 28 supports the resilient material of flat surface 31 of the movable valve element when surface 31 contacts fixed valve element 22 to close passage 23.

Actuating device 26 is mounted at end 11 of the valve and includes a resilient diaphragm 32 extending across mouth 13 and a push button 33 biased into engagement with the diaphragm by a helical compression spring 34. Push button 33 is cylindrical and has a rounded head 35 at one end and an annular flange 36 at the other end, the periphery of the flange being curled slightly toward head 35 to provide a seat 37 for one end of spring 34 which maintains the spring centered about member 33. The end of push button 33 opposite head 35 has a flat surface 38 which engages the surface of diaphragm 32 that faces away from chamber 12. The curled periphery of flange 36 provides a smooth rounded surface which will not damage diaphragm 32. Extending partially into push button 33 from surface 38 is a bore 39 with a closed end, the bore having a diameter slightly greater than the diameter of operating rod 25 so that rod 25 can slide into the bore 39 until it engages the end of the bore, so that the end wall of the bore acts as a stop against further movement of the rod.

Diaphragm 32 is circular and has a central axial projection 40, extending into chamber 12, and a short peripheral lip 41 extending in the same direction as projection 40. A circular opening 42 extends centrally through the diaphragm to accommodate operating rod 25. Opening 42 has a diameter somewhat smaller than rod 25, so that a seal is effected between the walls of opening 42 and the rod to prevent leakage of liquid from chamber 12.

Diaphragm 32, push button 33 and spring 34 are attached to valve body 1 by a sheet metal cap 43. Cap 43 is cup-shaped and has an end wall 44 with an opening 45 through which head 35 of push button 33 slidably extends. Extending from end wall 44 is a cylindrical side wall 46 of a diameter slightly less than mouth 13 of chamber 12. An annular skirt 47 projects axially away from side wall 46 and is connected to the end of side wall 46 by an integral annular outwardly projecting wall that forms an internal shoulder 48. Skirt 47 has an inside diameter slightly greater than the outside diameter of end 11 of body 1. When assembled, as shown in FIG. 1, spring 34 surrounds push button 33 and the head 35 extends through opening 45 of the cap, spring 34 being supported at one end by seat 37 and at the other end by end wall 44 of the cap. The portion of diaphragm 32 between internal shoulder 48 and end 11 of body 1 is compressed axially between these members to provide a liquid-tight seal. Skirt 47, which tapers inwardly toward its free end, compresses lip 41 radially against the surface of body 1 to provide a second seal. The cap is secured to body 1 by mechanically deforming the tip of skirt 47 inwardly into engagement with annular shoulder 15, as shown at 49.

Float lever 2 is formed of sheet metal and has a web 50 with short sides 51 projecting at right angles to the web to provide beam strength for the lever. One end of the lever is narrowed, as at 52, and has an opening 53 in which an internally threaded nut 54 is secured by deforming an end of the nut as shown. One end of a screw 55 is threaded into the nut and float 3 is threadedly attached to the other end of the screw. The end of the screw opposite the float has a hexagonal head for engagement by a suitable tool to adjust the height of the float relative to the lever.

At the end of lever 2 opposite the float, sides 51 are deformed inwardly at 56 so that the distance between the deformed portions is substantially the same as the width of the valve body 1, as seen in FIG. 5. Centrally of the deformed portions, a pair of aligned bores 57, FIG. 3, are provided to form journals, and lever 2 is pivotally attached to body 1 by pin 58. Web 50 has an upwardly deformed portion 59 which is punched to provide two pairs of diametrically opposed tabs 60 projecting toward fixed valve member 18. Deformed portion 59 and tabs 60 cooperate to fixedly retain a resilient gasket constituting the movable valve element 61. As shown in FIG. 1, the distance from the pivotal axis provided by pin 58 to the axis of discharge opening 16 is the same as the distance from pivot pin 58 to the axis of movable valve element 61, so that a flat surface 62 of valve element 61, disposed at right angles to the axis of discharge opening 16 when lever 2 is positioned as seen in FIG. 1, will close and seal the opening when an upward force is applied to the arm by float 3. A central portion of web 50 is cut away, as at 63, to prevent the accumulation of water and debris on the surface of the web.

In order that the valve can be manually latched in closed position, a wire bail 64 is swingably attached to lever 2 in such fashion as to be engageable with indentations 66 in the portion of wall 46 of cap 43 opposite the lever. Thus, the legs of the U-shaped bail are provided with inturned tips engaged in aligned openings 65 in side flanges 51 of the lever, openings 65 being approximately in the plane of wall 44 and the dimensions of the bail being such that, when lever 2 is pivoted upwardly to engage valve element 61 with valve element 18, the bail can be swung over cap 43 and engaged in one of the indentations 66, so that elements 18 and 61 are held in engagement.

It is to be noted that the length of operating rod 25 is sufficient to engage the end of bore 39 and hold movable valve element 24 spaced from fixed valve element 22 when spring 34 is substantially relaxed. This condition exists when the pressure in chamber 12 is substantially less than the pressure required to move diaphragm 32 to the left, as shown in FIG. 1. As the pressure in chamber 12 increases, the diaphragm is deformed away from chamber 12 and moves push button 33 to the left (FIG. 2) against the bias of spring 34. As the pressure increases diaphragm 32 moves push button 33 further, allowing operating rod 25 to move to the left until surface 31 of movable valve element 24 engages fixed valve element 22, whereupon flow of water through passage 29 is stopped. Should the pressure in chamber 6 increase when passage 29 is closed the effect of such increase will merely be to more firmly seat surface 31 against fixed valve element 22, because of the difference of area between surface 30 and the exposed area of surface 31 when the valve is closed. It is to be particularly noted that so long as there is pressure in chamber 6 whether passage 29 is opened or closed, valve element 24 will be biased to the left so that operating rod 25 engages the end of bore 39. This is due to the difference of area between surface 30 and surface 31. Since hydraulic pressure exerts a force normal to the surface against which the pressure acts, the force exerted by pressure of a liquid in chamber 6 on surface 30 will always be greater than the force exerted by the same pressure fluid on surface 31, and operating rod 25 will therefore always be held firmly against the end of bore 39.

The problem of leakage from the watering device at diaphragm 32 is eliminated by the unique construction of the diaphragm. In addition to sealing at the periphery of the diaphragm there must be a liquid tight seal where rod 25 passes through the opening 42 of the diaphragm. The central projection 40 is instrumental in maintaining an effective seal at opening 42. At low pressures in chamber 12, the natural resiliency of the elastic material of projection 40 is effective to grip rod 25 with sufficient force to prevent leaking along the rod. As the pressure of water in chamber 12 increases, this pressure acting on the projection is effective to radially compress the wall of the projection inwardly into effective sealing engagement with the rod. Hence, the pressure of the water in chamber 12 is effective to increase the sealing engagement between the wall of opening 42 of the diaphragm where such sealing is most vital, i.e. when the pressure in chamber 12 is at its greatest value.

*Assembly*

Since there is no positive connection between operating rod 25 and push button 33, the assembly and disassembly of the valve is quite simple. After body 1 is machined to its final dimensions, insert 20 is force fitted into bore 19. Valve element 24 is secured to head 27 and is inserted via end 5 and chamber 6 of the body so that operating rod 25 extends through passage 23. Spring 34, push button 33, and diaphragm 32 are then placed in cap 43 in that order, and opening 42 in the diaphragm is aligned with rod 25. The assembly is then moved axially toward the body so that rod 25 is forced through opening 42 into bore 39 until it engages the end of the bore, and skirt 47 passes over end 11 of body 1. Axial pressure is then applied to the cap to compress the portions of the diaphragm 32 between internal shoulder 48 and the annular end 11 of body 1. The terminal edge of skirt 47 is then mechanically deformed into groove 14 so that the deformed portion firmly seats against shoulder 15 to hold the cap and actuating device in position.

Attaching the float lever is also a simple operation requiring only that bores 57 be aligned with the pin bore of body 1 and that pin 58 be forced into the body to hold the float lever on its pivot.

Float 3 can be attached to lever 2 either before or after the lever is pivotally attached to the valve body. By virtue of the threaded connection at the base of screw 55, the screw can be threaded into nut 54 from above and then the float can be screwed on the threaded tip of the screw. Since bail 64 is formed of relatively thin wire, it is sufficiently resilient to permit its ends to be spread apart to clear side flanges 51 of float lever 2 so that the inturned ends of the legs of the bail can be inserted in openings 65 in the sides 51 provided for this purpose. After screen 9 is inserted through inlet 7, the valve is ready to be mounted on a trough for operation.

FIG. 2 shows the device mounted on an end wall 67 of trough 68, with threaded portion 10 of the body 1 extending through an opening in the trough and secured by a nut and a pair of washers, the latter being disposed one on each side of end wall 67. A water supply line 69 has a threaded sleeve 70 that is screwed on threaded portion 10 of body 1. The valve body is seen in FIG. 2 to be mounted with its longitudinal axis horizontal, float lever 2 extending generally horizontally under the body, and screw 55 having its axis upright, so that float 3 extends into the trough and is buoyed up by water 71.

Refer now to the force diagram of FIG. 6 showing the various forces acting on lever 2 when the discharge opening of the valve body 1 is closed. Of the forces shown in FIG. 6:

A is the buoyant force exerted by the water in the trough on the float and acts at the centerline of screw 55, a distance $S_1$ from the axis of pivot pin 58.

B is the force exerted by the water in the valve body and equals $P \times A$ where P is the pressure of water at the discharge opening and A is the area of the discharge opening, and acts at the axis of the discharge opening a distance $S_2$ from pivot pin 58.

C is a compression constant for the resilient material of the gasket of movable valve element 61, and acts at a distance $S_2$ from the axis of pivot pin 58.

W is the force due to the weight of the float and lever acting at the center of gravity of the assembly which is at a distance $S_3$ from the axis of pivot pin 58.

Since lever 2 is in static equilibrium when the discharge opening is closed, the forces on the lever must balance.

Summing the moments of force about the axis of pivot pin 58:

$$AS_1 - BS_2 - CS_2 - WS_3 = 0$$

Since the last two terms are essentially constant for a particular valve, let $$CS_2 - WS_3 = K$$

Then $$AS_1 - BS_2 - K = 0$$

and $$AS_1 = BS_2 + K$$

Hence, it is apparent that $AS_1$ must be greater than $BS_2$ to close the discharge opening. However, $$B = PA$$

where:

P is the pressure at the discharge opening
A is the area of the opening.

Since $$A = d^2/4$$

where $d$ is the diameter of the discharge opening, it is apparent that, B varies directly as the pressure at the discharge opening; B varies directly as the square of the diameter of the discharge opening. Correspondingly, the force A required to close the valve also varies directly with the square of the outlet diameter and directly with the pressure at the outlet. This relationship is shown in the graph of FIG. 7, which is a plot of outlet diameter (abscissa) and the force acting at the axis of the outlet required to close the valve (ordinate). The graph shows a family of curves for pressures of 10, 20 and 30 p.s.i.g. at the outlet of discharge opening 16. It can be seen from the graph of FIG. 7, that, once a particular outlet diameter is selected, the force required to close the valve varies only with pressure, the positions of outlet and float along the lever arm, of course, being constant.

The graph of FIG. 8 shows the relationship between the supply line pressure and the pressure at the outlet of discharge opening 16, in solid line for the watering device of the present invention with pressure regulator, and in dotted line for a watering device without a pressure regulator. It can thus be seen, by reference to FIGS. 7 and 8 that the force required to close the discharge opening of a particular valve varies directly with the pressure in chamber 12, and the inlet pressure if the valve does not have a pressure regulator. However, in the valve of the present invention with a pressure regulator, the outlet pressure equals the supply line pressure only until the supply line pressure reaches a certain predetermined maximum value. This predetermined maximum value is 10 p.s.i.g. for the preferred embodiment of the valve and is shown as $P_{max}$, FIG. 8. It is thus apparent that fluctuations in supply line pressure below the predetermined maximum value affect the pressure of fluid at discharge passage 16 since the pressure regulator does not operate in this region. However, as the supply pressure increases, the regulator does operate and is effective to prevent outlet pressures greater than the predetermined maximum. Because of this arrangement, the force A required to close discharge opening 16 is always less than a predetermined maximum value so long as the pressure regulator operates properly.

In operation, water flows from supply line 69 to chamber 6 via inlet 7 and through filter screen 9. Assuming that there is little water in the trough, the movable valve element 61 will be spaced from fixed valve element 18 and water will flow through annular passage 29 into chamber 12 and thence through discharge opening 16 into the trough. As the level of the water in the trough increases, float 3 will be buoyed upwardly to gradually move valve element 61 into engagement with fixed valve member 18 to close discharge opening 16.

When the discharge opening begins to close, the pressure of water in chamber 12 will increase and deform diaphragm 32 away from chamber 12. When the discharge opening is completely closed, the pressure in chamber 12 increases to further deform diaphragm 32 and move push button 33 away from chamber 12 until movable valve element 24 closes passage 23, which occurs when the pressure in chamber 12 is at the predetermined maximum value which the regulator maintains in the chamber. Obviously, the regulator will not operate to close passage 23 if the supply line pressure is less than the predetermined maximum value at which the regulator operates.

As the water in the trough is consumed by poultry the float will lower to open discharge opening 16. As soon as discharge opening 16 opens the pressure in chamber 12 drops and spring 34 moves push button 23 and hence operating rod 25 to open passage 23 so that more water is supplied to chamber 12. This process is automatic and continuous in operation of the valve.

To avoid severe problems of water hammer during operation of the valve the following relationships were found necessary:

(1) The effective area of diaphragm 32 exposed to water in chamber 12 must be more than 40 times as great as the area of discharge opening 16.

(2) The diameter of movable valve element 24 must be less than 4 times the diameter of rod 25.

(3) The area of orifice 9' must be approximately equal to the area of the annulus between rod 25 and inlet passage 23'.

It is believed that the effect of maintaining the effective area of diaphragm 32 at the above stated ratio prevents a snap action of valve 24 when pressure in chamber 12 is reduced by a mere trickle of water from discharge opening 16. Using the designated area ratio water in chamber 12 tends to retard the speed at which spring 34 moves the diaphragm to open valve 24.

The difference in diameter of valve element 24 and rod 25 is believed to slow down closing of the regulating valve by assuring that the differential forces due to pressure on faces 30 and 31 are less than would close the valve with a snap action.

The area of orifice 9' is maintained as designated to prevent surges of line pressure through the valve passages which may rapidly deform the diaphragm and cause valve 24 to snap shut.

Because the water supply for poultry frequently contains foreign matter such as silt and mud, the valve is constructed with a self-cleaning feature which effectively prevents foreign matter from accumulating between movable valve element 24 and fixed valve element 22, which would prop the valve open. Self-cleaning results from the relative dimensions of rod 25 and the diameter of inlet passage 23'. It has been found that the diameter of inlet passage 23' must not be more than $\frac{1}{16}$ inch greater than the diameter of rod 25. It is believed that the small annulus provided by such dimensioning causes rapid flow of water along face 31 of valve 24 when the valve is almost closed, and the rapid flow acts to wash foreign matter from between the valving surfaces.

Although it is eventually necessary to disassemble the entire valve for cleaning, such cleaning need only be done every year or so because of another unique cleaning feature of the valve. This feature permits manually purging the valve without disassembly, by applying full existing line pressure to the valve while maintaining both the pressure regulator valve and the discharge valve open at the same time. Because of its unique construction an attendant can purge the watering valve merely by holding the float down to open the discharge opening, and by simultaneously pushing head 35 of push button 33 to manually render the pressure regulator inoperative so that valve element 24 is spaced from valve element 22 to allow water at full supply line pressure to flow through the watering valve. Such purging is normally effective to remove accumulated silt and mud from both chambers 6 and 12.

Now consider the arrangement of FIG. 2 wherein the water level in the trough is to remain at a predetermined height 72. This height 72 corresponds to the height of water in the trough that is required to buoy float 3 upwardly with a force sufficient to move valve element 61 against fixed valve member 18 to close discharge opening 16 when the pressure is at the predetermined maximum value which the regulator maintains. So long as the supply line pressure exceeds the pressure at which pressure regulator 4 operates, the water supply valve will maintain the water in the trough at height 72, the valve being effective to automatically supply additional water to the trough as it is consumed by poultry or other livestock. Should the pressure in supply line 69 fall below the predetermined maximum, there will be insufficient pressure in chamber 12 to deform diaphragm 13 against the bias of spring 34. Therefore, movable valve 24 will not engage fixed valve element 22 and inlet passage 29 will remain open. Hence, it is apparent that the effect of a decrease in supply line pressure to a value less than the predetermined maximum is to render pressure regulator 4 inoperative.

The effect of such a decrease in supply line pressure is to decrease the force necessary to close discharge opening 16 against the pressure at the discharge opening. Hence, when the pressure in supply line 69 falls below the predetermined maximum, discharge passage 16 will remain closed until the water in the trough decreases to a height 73, for example. Since the actual decrease in height is very slight the poultry can continue to drink.

Consider now the operation of a valve without a pressure regulator. For line pressure below the predetermined maximum, the operation will be the same as a valve with a pressure regulator. However, as the supply line pressure increases above the predetermined maximum, the outlet pressure will also increase, since the outlet pressure equals the inlet pressure when no regulator is used. Under these circumstances, the water level in the trough must rise to a height, as indicated for example at 74, to close the discharge opening against the pressure in the valve. As the supply line pressure increases further, more buoying force will be required to lift the float to close the valve. Eventually, a point will be reached where the float will be completely submerged, whereupon the trough will overflow and flood the area adjacent the trough. Since the trough itself is only several inches high, it is highly desirable to fill the trough as full as possible without danger of overflow. With a valve that includes pressure regulator 4, the trough can be filled to within ¼ of an inch of its top without danger of overflow. However, if a conventional valve is used, the water level must be maintained a substantially greater distance below the top edge of the trough to avoid overflow due to fluctuations of supply line pressure. Since the valve with the pressure regulator permits more accurate control of the water level, the level can be maintained very close to the top of the trough to provide an abundant supply of water in the trough which can easily be reached even by baby chicks.

Since the force that is required to close discharge opening 16 can be accurately predetermined irrespective of supply line pressure fluctuations, both float 3 and float lever 2 can be reduced in size to the most economical proportions. In the preferred embodiment of the valve, as shown in FIGS. 1 and 2, the effective length of float lever 2 is only 2¼ inches from the line of action of float 3 to the axis of pivot pin 58. The distance from the axis of discharge opening 16 to pivot pin 58 is only ⅜ of an inch.

It has further been determined that the discharge opening must have a diameter not less than $\frac{1}{16}$ of an inch, so that foreign matter in the water will flow freely through the discharge opening without clogging the opening. If the diameter of the discharge opening is made less than $\frac{1}{16}$ of an inch, the problem of clogging frequency occurs with available water supplies. It is accordingly not practical to reduce the diameter of the discharge opening enough to allow a marked reduction in size of the float and arm assembly.

Though one particularly advantageous embodiment of the invention has been chosen for illustration, it will be understood by those skilled in the art that various changes and modifications can be made therein without departing from the scope of the invention as defined in the appended claims.

What is claimed is:

1. In a compact poultry watering device, the combination of
  a watering trough;
  a valve body defining a chamber having an inlet opening and a discharge opening;
  a water supply line connected to said valve body;
  a first movable valve element arranged for movement between a first position in which it opens said inlet opening and a second position in which it closes said inlet opening;
  actuating means responsive to the water pressure in said chamber and connected to said first movable valve element to actuate the same to said second position whenever the pressure in said chamber equals a predetermined value and to maintain the same in said first position whenever said pressure is less than said predetermined value, whereby the maximum pressure in said chamber is regulated;
  a lever pivotally connected to said valve body;
  a float connected to said lever at a point spaced from the point where said lever is pivotally connected to said valve body;
  a second movable valve element operatively connected to said lever disposed with respect to said discharge opening;
  said second movable valve element being external to said chamber and movable between
    a first position in which said second movable valve element engages and seals said discharge opening and has a predetermined area thereof exposed to the pressure in said chamber, and
    a second position in which said second movable valve element is spaced from said discharge opening and is unaffected by pressure in said chamber;
  said float exerting a force to pivot said lever in one direction to move said second movable valve element to said first position in response to a certain predetermined level of water in said trough;
  said pressure in said chamber exerting a force on said second movable valve element tending to move said element from said first position to said second position and correspondingly to pivot said lever in a direction opposite to said one direction;
  said force on said second movable valve element from pressure in said chamber being limited by the regulation of the pressure in said chamber regardless of line pressure to the chamber, whereby said float and lever are substantially smaller and more compact than those normally required to close said discharge opening when the water in said trough is at said certain predetermined maximum level and the pressure in said supply pipe exceeds said predetermined value, and
  said predetermined maximum level is closely maintained by the smaller, compact float and lever.

2. A poultry watering valve in accordance with claim 1 in which
  said actuating means responsive to the pressure in said chamber includes a spring biased diaphragm extending across said chamber.

3. A poultry watering valve in accordance with claim 1 which includes manually operated means for moving said first movable valve element from said first position to said second position to open said inlet opening, whereby water at supply line pressure will flow through said chamber to purge said watering valve.

4. A poultry watering valve in accordance with claim 1 in which said first movable valve element is situated outside said chamber and includes a force transmitting member extending into said chamber and connected to said actuating means.

5. A poultry watering device according to claim 1 wherein said second movable valve element is fixed to said lever.

6. In a poultry watering valve, the combination of an elongated valve body having an axis, said body defining;

a first cylindrical chamber extending axially of said body a second cylindrical chamber extending axially of said body in axially spaced relation to said first chamber, and a passage extending between said chambers to form an inlet opening for said first chamber;

said first chamber having a discharge opening extending through a side wall thereof;

a first movable valve element arranged for movement between a first position in which it opens said inlet opening and a second position in which it closes said inlet opening;

actuating means responsive to the fluid pressure in said first chamber to actuate said first movable valve element to said second position whenever the pressure in said first chamber equals a predetermined value and maintain the same in said first position whenever said pressure is less than said predetermined value, a second movable valve element operatively disposed with respect to said discharge opening, operating means for said second movable valve element connected to said valve body, said operating means including a float to move said second movable valve element to open and close said discharge passage said first chamber extending from one end of said valve body;

said second chamber extending from the other end of said valve body; and said first valve element being disposed in said second chamber;

said actuating means responsive to the pressure in said first chamber including:

a diaphragm extending across that end of the first chamber opposite the inlet opening, a spring on the side of said diaphragm opposite from the side which faces said first chamber to normally move said diaphragm toward said first chamber, and an operating rod extending between said diaphragm and said first movable valve element; and said operating rod being effective to move said first valve element under the influence of said diaphragm and spring;

said actuating means and first movable valve element being effective to accurately regulate the pressure in said first chamber at said predetermined value so that said second movable valve element will close said discharge opening whenever a predetermined force is applied to said operating means via said float.

7. A poultry watering valve in accordance with claim 6 which further includes a push button on the same side of said diaphragm as said spring and in engagement with said diaphragm, said push button being manually operable to overcome the influence of said diaphragm on said operating rod to enable said first valve element to be manually moved to said first position in which said inlet valve is open.

8. In a poultry watering valve, the combination of a valve body defining a chamber having an inlet opening and a discharge opening;

a first movable valve element arranged for movement between a first position in which it opens said inlet opening and a second position in which it closes said inlet opening;

actuating means responsive to the fluid pressure in said chamber and connected to said first movable valve element to actuate the same to said second position whenever the pressure in said chamber equals a predetermined value and maintain the same in said first position whenever said pressure is less than said predetermined value;

a second movable element operatively disposed with respect to said discharge opening, operating means for said second movable valve element connected to said valve body, a float spaced from said body and connected to said operating means, said float and operating means being effective to move said second movable valve element to open and close said discharge opening;

said chamber having an enlarged mouth defined by a wall of said valve body adjacent an end of said body;

said actuating means including a diaphragm extending across said mouth in sealed relationship with said wall of said body so that one side of said diaphragm is exposed to pressure in said chamber and the other side is exposed to atmospheric pressure, and spring means for biasing said first movable valve element toward said first position in which it opens said inlet opening;

said actuating means and first movable valve element being effective to accurately regulate the pressure in said chamber at said predetermined value so that said second movable valve element will close said discharge opening whenever a predetermined force is applied to said operative means by said float.

9. A poultry watering valve in accordance with claim 8 in which said first movable valve element is situated outside said chamber and has an elongated operating rod extending through said inlet opening into said chamber, and through a central opening in said diaphragm, said operating rod engaging a member in contact with the side of said diaphragm exposed to atmospheric pressure, said member moving with said diaphragm and having a surface engaging said operating rod.

10. In a poultry watering valve, the combination of;

a valve body defining a chamber having an inlet opening and a discharge opening;

a first moveable valve element arranged for movement between a first position in which it opens said inlet opening and a second position in which it closes said inlet opening;

a second moveable valve element operatively disposed with respect to said discharge opening;

actuating means responsive to the fluid pressure in said chamber to actuate said first moveable valve element to said second position whenever the pressure in said chamber equals a predetermined value and maintain the same in said first position whenever said pressure is less than said predetermined value;

said actuating means comprising a diaphragm responsive to the pressure in said chamber, an operating rod extending through said diaphragm adjacent the center of said diaphragm, and an elongated annular projection on said diaphragm having an interior surface in elastic gripping engagement with said operating rod and an exterior surface;

said exterior surface of said projection being exposed to the pressure in said chamber to enable said pressure to compress the interior surface of said projection into tight sealing engagement with said rod, whereby leakage from said chamber between said diaphragm and said rod is prevented at the various pressures in said chamber.

References Cited by the Examiner

UNITED STATES PATENTS

| | | | |
|---|---|---|---|
| 558,660 | 4/1896 | Reissing | 137—505.34 X |
| 1,860,046 | 5/1932 | McCutcheon | 137—614.19 X |
| 2,463,493 | 3/1949 | Norway | 137—614.19 X |

FOREIGN PATENTS 201,962  8/1923  Great Britain.

WILLIAM F. O'DEA, *Primary Examiner.*

D. MATTHEWS, *Assistant Examiner.*